(12) United States Patent
Sakuragi et al.

(10) Patent No.: US 9,494,187 B2
(45) Date of Patent: Nov. 15, 2016

(54) FLUID BEARING, MOTOR AND POLYGON MIRROR SCANNER MOTOR

(71) Applicant: MINEBEA CO., LTD., Kitasaku-Gun, Nagano (JP)

(72) Inventors: Katsunori Sakuragi, Yonago (JP); Michiharu Yamamoto, Yonago (JP); Shuji Akiyama, Yonago (JP)

(73) Assignee: Minebea Co., Ltd., Nagano (JP)

( * ) Notice: Subject to any disclaimer, the term of this patent is extended or adjusted under 35 U.S.C. 154(b) by 0 days.

(21) Appl. No.: 14/629,569

(22) Filed: Feb. 24, 2015

(65) Prior Publication Data
US 2015/0240866 A1 Aug. 27, 2015

(30) Foreign Application Priority Data
Feb. 24, 2014 (JP) .................................. 2014-033203

(51) Int. Cl.
| F16C 17/08 | (2006.01) |
| G02B 26/12 | (2006.01) |
| H02K 7/08 | (2006.01) |
| F16C 43/02 | (2006.01) |
| F16C 17/10 | (2006.01) |
| F16C 33/10 | (2006.01) |
| H02K 5/167 | (2006.01) |

(52) U.S. Cl.
CPC ............. *F16C 17/08* (2013.01); *F16C 17/107* (2013.01); *F16C 33/103* (2013.01); *F16C 43/02* (2013.01); *G02B 26/121* (2013.01); *H02K 5/1675* (2013.01); *H02K 7/08* (2013.01)

(58) Field of Classification Search
CPC .... F16C 32/06; F16C 32/0633; F16C 17/08; F16C 17/10; F16C 17/102; F16C 17/105; F16C 35/02; F16C 2370/22; H02K 5/167; H02K 7/08; G02B 26/121
USPC ........ 359/200.3, 200.4, 200.7; 384/100–124; 310/90; 360/99.07, 99.08
See application file for complete search history.

(56) References Cited

U.S. PATENT DOCUMENTS

| 5,541,462 | A | * | 7/1996 | Nii | ....................... F16C 33/1035 |
| | | | | | 310/90 |
| 7,988,361 | B1 | * | 8/2011 | Mori | ..................... F16C 17/026 |
| | | | | | 384/114 |
| 2007/0140605 | A1 | * | 6/2007 | Asada | ................... F16C 17/107 |
| | | | | | 384/107 |
| 2008/0203839 | A1 | * | 8/2008 | Kakinuma | ............ F16C 17/026 |
| | | | | | 310/90 |
| 2008/0298730 | A1 | * | 12/2008 | Hino | ...................... F16C 17/107 |
| | | | | | 384/107 |
| 2008/0298731 | A1 | * | 12/2008 | Hino | ....................... F16C 17/10 |
| | | | | | 384/107 |
| 2012/0049676 | A1 | * | 3/2012 | Lee | ......................... F16C 17/10 |
| | | | | | 310/90 |
| 2013/0336604 | A1 | * | 12/2013 | Noda | ................... F16C 32/0633 |
| | | | | | 384/107 |
| 2014/0036390 | A1 | * | 2/2014 | Lee | ........................ H02K 7/086 |
| | | | | | 360/99.08 |

FOREIGN PATENT DOCUMENTS

| JP | H06-066315 | A | | 3/1994 |
| JP | 2000-346075 | A | | 12/2000 |
| JP | 2006-275077 | A | | 10/2006 |
| JP | 4534761 | B2 | * | 9/2010 | ............ F16C 33/726 |

\* cited by examiner

*Primary Examiner* — Frank Font
(74) *Attorney, Agent, or Firm* — Carrier Blackman & Associates, P.C.; Joseph P. Carrier; Jeffrey T. Gedeon (57) ABSTRACT

There is provided a fluid bearing including: a sleeve having a bearing hole; a shaft being inserted into the bearing hole to be rotatable with respect to the sleeve; a thrust portion that is fixed to the sleeve and covers one end portion of the bearing hole; and a liquid filled in a gap between the sleeve and the shaft. The bearing hole is configured to have a first portion having a first diameter; a second portion that is located at an end portion that is closer to the thrust portion than the first portion, the second portion having a second diameter that is substantially the dame with the first diameter; and a groove that is located at a position between the first portion and the second portion.

22 Claims, 7 Drawing Sheets

FLUID BEARING, MOTOR AND POLYGON MIRROR SCANNER MOTOR

BACKGROUND OF THE INVENTION

1. Field of the Invention

The present invention relates to a fluid bearing, a motor, and a polygon mirror scanner motor, and more particularly to a fluid bearing, motor, and polygon mirror scanner motor in which the reliability can be improved.

2. Description of the Related Art

A motor may use a ball bearing or a fluid dynamic pressure bearing in order to rotatably support a rotor with respect to a stator. Among such bearings, a fluid dynamic bearing is configured so that a shaft is supported by using the dynamic pressure of a fluid which is generated during rotation. In a fluid dynamic bearing, grooves for generating a dynamic pressure are arranged in at least one of an outer circumferential portion of a shaft, and an inner circumferential portion of a sleeve into which the shaft is inserted. In such a fluid dynamic bearing, a radial bearing which receives a load in a radial direction of the shaft is formed from dynamic pressure generated by the fluid that is interposed between the shaft and the sleeve. Furthermore, a thrust receiving member is placed in a lower end portion of the shaft, or a position opposed to a lower end portion of the shaft, and a thrust bearing which receives a load in the thrust direction of the shaft is formed by a dynamic pressure generated in grooves for generating a dynamic pressure that are arranged in at least one of a lower end portion of the shaft, and the thrust receiving member. There is another known structure, in which a radial bearing is combined with a thrust bearing which receives a load, and in which a groove for generating a dynamic pressure is not placed in a lower end portion of a shaft, a spherical portion is disposed therein, and a thrust plate not having grooves for generating a dynamic pressure is placed in a position opposed to a lower end portion of the shaft.

In a fluid dynamic bearing, when air bubbles (air) exist inside the bearing, reduction of the generated dynamic pressure or the like occurs, thereby impairing bearing performance characteristics and bearing life. Therefore, several methods (degassing methods) of preventing air bubbles from existing in a bearing have been proposed.

For example, JP-A-06-066315 discloses a dynamic bearing rotating device in which a rotation shaft and a sleeve are rotatably fitted to each other, a dynamic thrust bearing is formed by a shallow groove disposed in a thrust plate, and the inner circumferential surface of the sleeve, and a dynamic radial bearing is formed by herringbone-like shallow grooves disposed in the outer circumferential surface of the rotation shaft, and the inner circumferential surface of the sleeve. In the dynamic bearing rotating device, escaping portions are formed in the inner circumferential surface of the sleeve, and tapered surfaces having an angle of 30 deg. or less are disposed in the escaping portions.

JP-A-2006-275077 discloses a dynamic bearing device which includes a bearing sleeve having: two herringbone grooves; oil sump step portions that are formed in the both ends of the herringbone grooves, respectively; and spiral grooves that are formed in the vicinities of the outlets of the bearing, respectively, and in which the pattern widths of the herringbone grooves and the spiral grooves, and the lengths of the oil sump step portions are set to have predetermined relationships. In the dynamic bearing device, an annular escaping portion is formed between the two herringbone grooves of the bearing sleeve.

JP-A-2000-346075 discloses a fluid dynamic bearing including: a stator having a sleeve; a rotor having a rotation shaft which is rotatably supported by the sleeve: a dynamic pressure generating groove which is formed in one of the sleeve and the rotation shaft: and oil filled into the sleeve. In the fluid dynamic bearing, a tapered surface is disposed in a lower end portion of the shaft.

Figure 12:
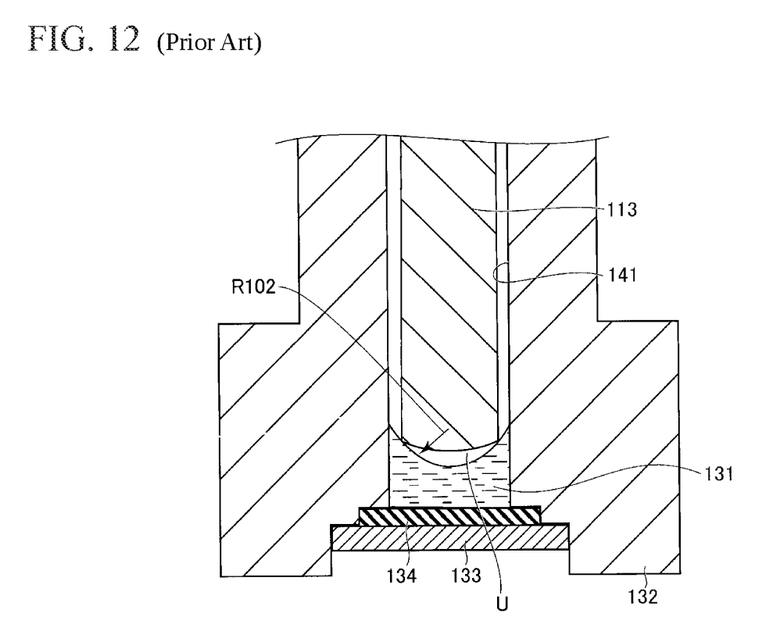
FIG. 12 is a sectional view schematically showing a step of assembling a conventional fluid dynamic pressure bearing.

FIG. 12 is a sectional view schematically showing a step of assembling a conventional fluid dynamic bearing.

As shown in FIG. 12, in the step of assembling a conventional fluid dynamic bearing, a shaft 113 is inserted in a state where a lower end portion of a bearing hole 141 of a sleeve 132 is covered by a thrust cover 133 and a thrust plate 134, and oil 131 is filled into the bearing hole 141. thereby assembling the fluid dynamic bearing.

However, there is a tendency that the maximum value R102 of the liquid surface curvature radius of the oil 131 is reduced by the surface tension of the oil 131. During the insertion of the shaft 113, therefore, a situation easily occurs where the side surface of the shaft 113 is in contact with the oil 131 before the lower end surface of the shaft 113 becomes in contact with the oil 131, the oil 131 ascends the inner wall surface of the bearing hole 141, and the air is trapped at a lower portion U of the shaft 113. As a result, the air is not sufficiently evacuated and remains in the oil 131, thereby causing the reliability of the fluid dynamic bearing to be reduced. The reduction in reliability due to residual air in oil causes problems not limited to only fluid bearings that generate dynamic pressure, but is common to all kinds of fluid bearings. This problem can be solved to some extent by disposing a tapered surface in a lower end portion of a shaft. However, this countermeasure cannot achieve a sufficient effect.

SUMMARY OF THE INVENTION

The present invention has been made in view of the above circumstances, and one of the objects of the present invention is to provide a fluid bearing, motor, and polygon motor in which the reliability can be improved.

According to an illustrative embodiment of the present invention, there is provided a fluid bearing including: a sleeve having a bearing hole; a shaft being inserted into the bearing hole to be rotatable with respect to the sleeve; a thrust portion that is fixed to the sleeve and covers one end portion of the bearing hole; and a liquid filled in a gap between the sleeve and the shaft. The bearing hole is configured to have: a first portion having a first diameter; a second portion that is located at an end portion that is closer to the thrust portion than the first portion, the second portion having a second diameter that is substantially the same with the first diameter; and a large-diameter portion that is located at a position between the first portion and the second portion, the large-diameter portion having a third diameter that is larger than the first diameter.

According to another illustrative embodiment of the present invention, there is provided a motor that is provided with: the fluid bearing according the illustrative embodiment; a magnet disposed in a rotation body including one of the shaft and the sleeve; and a coil disposed on a stator core, the coil generating a driving force by an interaction with magnetic fields of the magnet.

According to another illustrative embodiment of the present invention, there is provided a polygon mirror scanner motor that is provided with: the motor according to the another illustrative embodiment; and a polygon mirror that is configured to be rotated by the motor.

According to another illustrative embodiment of the present invention, there is provided a fluid bearing that is provided with: a sleeve having a bearing hole; a shaft being inserted into the bearing hole to be rotatable with respect to the sleeve; a thrust portion that is fixed to the sleeve and covers one end portion of the bearing hole; and a liquid filled in a gap between the sleeve and the shaft. The bearing hole is configured to have: a first portion having a first diameter: a second portion that is located at an end portion that is closer to the thrust portion than the first portion, the second portion having a second diameter that is substantially the same with the first diameter; and a large-diameter portion that is located at a position between the first portion and the second portion, the large-diameter portion having a third diameter that is larger than the first diameter. The fluid bearing is assembled by: fixing the thrust portion to the sleeve to cover the one end portion of the bearing hole; filling the liquid in the bearing hole to a height that a liquid surface of the liquid is in contact with an inner wall surface of the bearing hole in the large-diameter portion; and inserting the shaft into the bearing hole in which the liquid is filled.

DETAILED DESCRIPTION

Hereinafter, an embodiment of the invention will be described with reference to the drawings.

In the embodiment described below, a fluid bearing is applied to a polygon scanner motor (polygon mirror scanner motor) which is used in laser scanning in a laser beam printer or the like. However, the fluid bearing of the embodiment may be applied to any kind of component. In place of a polygon mirror scanner motor, for example, the fluid bearing may be applied to an HDD spindle motor for rotating a disk of an HDD (Hard Disk Drive), or the like.

Figure 1:
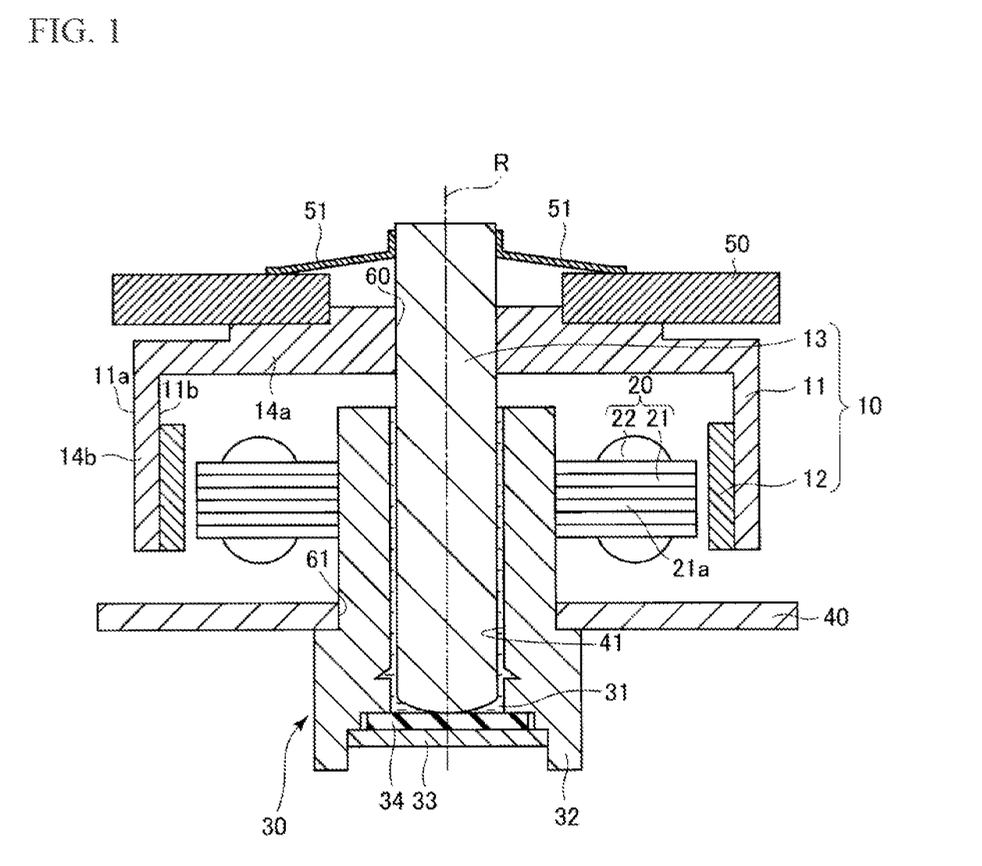
FIG. 1 is a sectional view showing an example of a polygon scanner motor to which a fluid bearing according to an embodiment of the present invention is applied.

FIG. 1 is a sectional view showing an example of the polygon scammer motor to which the fluid bearing according to the embodiment of the invention is applied. In the following description, the direction (in FIG. 1, the downward direction) which extends from a spring 51 toward a thrust cover 33 along the rotation axis R is often referred to as the downward direction, and that (in FIG. 1, the upward direction) which extends from the thrust cover 33 toward the spring 51 along the rotation axis R is often referred to as the upward direction.

As shown in FIG. 1, the polygon scanner motor of the embodiment is used for rotating a polygon mirror to scan a laser beam. The polygon scanner motor mainly includes a rotor 10 (an example of the rotation body), a stator 20, a fluid bearing 30, a base plate 40, and a polygon mirror 50. The rotor 10 is supported rotatably about the rotation axis R with respect to the stator 20, by the fluid bearing 30. The rotor 10 includes a rotor frame 11, magnets 12, and a shaft 13. In the rotor 10, the shaft 13 extends in the vertical direction in FIG. 1 so as to pass through the center part of the rotor frame 11. The rotor frame 11 can be rotated together with the shaft 13 about the rotation axis R. The magnets 12 are attached to the rotor frame 11 so as to be opposed to the stator 20.

The rotor frame 11 prevents the magnetic field from leaking from the inside of the rotor frame 11, and is made of, for example, a magnetic material. The rotor frame 11 has a ceiling portion 14a which extends, for example, in a direction (the outer circumferential direction, a lateral direction in FIG. 1) that is perpendicular to the rotation axis R, and a side wall portion 14b which extends, for example, in a direction (the vertical direction in FIG. 1) that is parallel to the rotation axis R. The ceiling portion 14a has a circular shape in a plan view. A hole 60 through which the shaft 13 is passed is disposed in the center part of the ceiling portion 14a. The rotor frame 11 is fixed to the shaft 13 in the hole 60. Above the ceiling portion 14a, the polygon mirror 50 for reflecting a laser beam is fixed to the shaft 13 by the spring 51. The side wall portion 14b extends in the downward direction from an outer-diameter side end portion of the ceiling portion 14a. The side wall portion 14b has a cylindrical shape, and has an outer wall surface 11a which is a surface directed toward the outer circumference, and an inner wall surface 11b which is a surface directed toward the inner circumference. The magnets 12 are attached to the inner wall surface 11b.

The stator 20 includes a stator core 21 having a plurality of tooth portions 21a which are formed so as to radially extend from the center toward the radially outer side, and stator coils 22 wound around the peripheries of the tooth portions 21a. The stator 20 is placed further on the inner circumferential side than the magnets 12 so as to be opposed to the magnets 12 across a space. When an electrical current flows through the stator coils 22, magnetic fields are generated. A driving force (force for rotating the rotor 10) is generated by the interaction between the magnetic fields of the stator coils 22 and the magnets 12.

A hole 61 is formed in the center part of the base plate 40. The shaft 13, and a sleeve 32 of the fluid bearing 30 are passed through the hole 61. Although not illustrated, an FG pattern for detecting the rotational speed of the magnets 12 based on a change of the magnetic fields generated from the magnets 12, a driving/controlling integrated circuit for driving and controlling the brushless motor, chip type electronic components (resistors and capacitors), a power MOS array for turning ON/OFF applications of voltages to the stator coils 22, and the like may be formed on the base plate 40.

The fluid bearing 30 may be produced as a fluid dynamic bearing by forming grooves (dynamic pressure grooves) for generating a dynamic pressure, in at least one of the outer-diameter side end surface of the shaft 13, and the inner wall surface of a bearing hole 41 of the sleeve 32. The bearing hole 41 may penetrate as illustrated, or may be closed. The magnets 12 may be disposed in one of the rotor 10 and the stator 20, while the stator coils 22 are disposed on the other of the rotor 10 and the stator 20.

Figure 2:
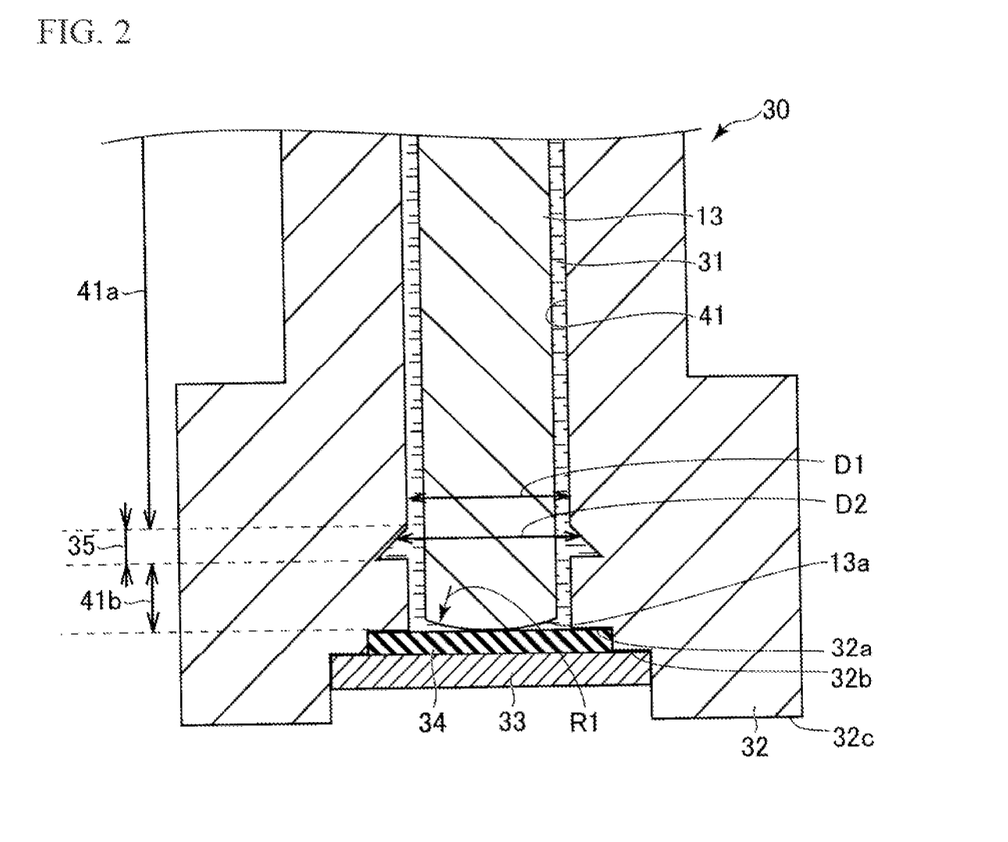
FIG. 2 is a sectional view showing the configuration of the fluid bearing included in the polygon scanner motor of FIG. 1.

FIG. 2 is a sectional view showing the configuration of the fluid bearing 30 included in the polygon scanner motor of FIG. 1. FIG. 2 shows only a part of the fluid bearing 30.

As shown in FIGS. 1 and 2, the fluid bearing 30 is provided with the shaft 13, the sleeve 32, a thrust cover 33, and a thrust plate 34 (an example of the thrust portion). The sleeve 32 includes the bearing hole 41, and the shaft 13 is inserted into the bearing hole 41. A space (between the sleeve 32 and the shaft 13) defined by the outer-diameter side end surface (outer wall surface) of the shaft 13, the inner wall surface of the bearing hole 41, and the thrust plate 34 is filled with oil (an example of the liquid) 31. The oil 31 plays a role of a lubricant for reducing wear and friction of the shaft 13, the sleeve 32, and the thrust plate 34, and to prevent seizure from occurring.

A groove 35 (an example of the large-diameter portion) is formed in the vicinity of the thrust plate 34, and in the inner wall surface (in the vicinity of the bottom surface of the bearing hole 41) of the sleeve 32 facing the inside of the sleeve 32. The bearing hole 41 includes the groove 35, an upper portion 41a (an example of the first portion) which exists above the groove 35 (on the side of the spring 51), and a lower portion 41b (an example of the second portion) which exists below the groove 35 (on the side of the thrust cover 33). Preferably, the lower portion 41b is in a lower end portion (position where the shaft is in contact with the thrust portion) of the bearing hole 41. The lower portion 41b has a diameter which is equivalent to the diameter D1 of the upper portion 41a, and preferably has the diameter D1 which is equal to the diameter of the upper portion 41a. The groove 35 has a diameter D2 which is larger than the diameter D1. The diameter D2 changes in a direction of the rotation axis R.

The lower end surface 13a of the shaft 13 is configured by a curved surface. The lower end surface 13a has a curvature radius R1.

The lower end surface of the sleeve 32 has a step-like shape, and is configured by three end surfaces 32a to 32c. The end surfaces 32a to 32c are disposed in this sequence starting from the inner diameter side toward the outer diameter side, and starting from the upper portion of the sleeve 32 toward the lower portion.

The thrust cover 33 covers a lower end portion of the bearing hole 41, and is fixed to the end surface 32b. The thrust plate 34 is placed between the thrust cover 33 and the lower end surface 13a of the shaft 13, and attached to the end surface 32a. The center part of the upper surface of the thrust plate 34 is in contact with the lower end surface 13a of the shaft 13. The thrust plate 34 is placed between the shaft 13 and the thrust cover 33 in a state where an outer-diameter portion of the plate is elastically deformed by being pressed by the sleeve 32 and the thrust cover 33.

Next, a method of assembling the polygon scanner motor of the embodiment will be described with reference to FIGS. 3 to 6.

Figure 3:
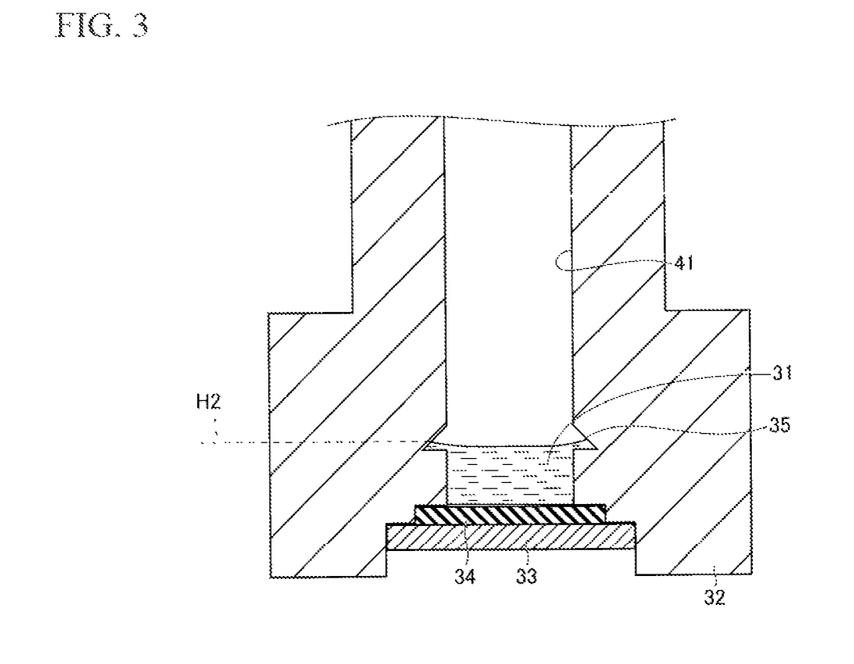
FIG. 3 is a sectional view showing a first step of a method of assembling the polygon scanner motor.

FIG. 3 is a sectional view showing a first step of the method of assembling the polygon scanner motor of the embodiment of the invention.

As shown in FIG. 3, the lower end portion of the bearing hole 41 is covered by the thrust cover 33 and the thrust plate 34, and the thrust cover 33 is fixed to the sleeve 32. Then, a predetermined quantity of the oil 31 is poured into the bearing hole 41. The oil 31 lands on the thrust plate 34 and ascends the inner wall surface of the bearing hole 41. When the oil 31 reaches the groove 35, the rise of the liquid surface of the oil 31 is stopped. In the state where the oil 31 is poured into the bearing hole 41 and the shaft 13 is not yet inserted into the bearing hole 41, as a result, the liquid surface H2 of the oil 31 in the part where the oil is in contact with the inner wall surface of the bearing hole 41 is positioned in the groove 35 (in other words, the liquid surface H2 exists between the upper and lower end portions of the groove 35).

Figure 4:
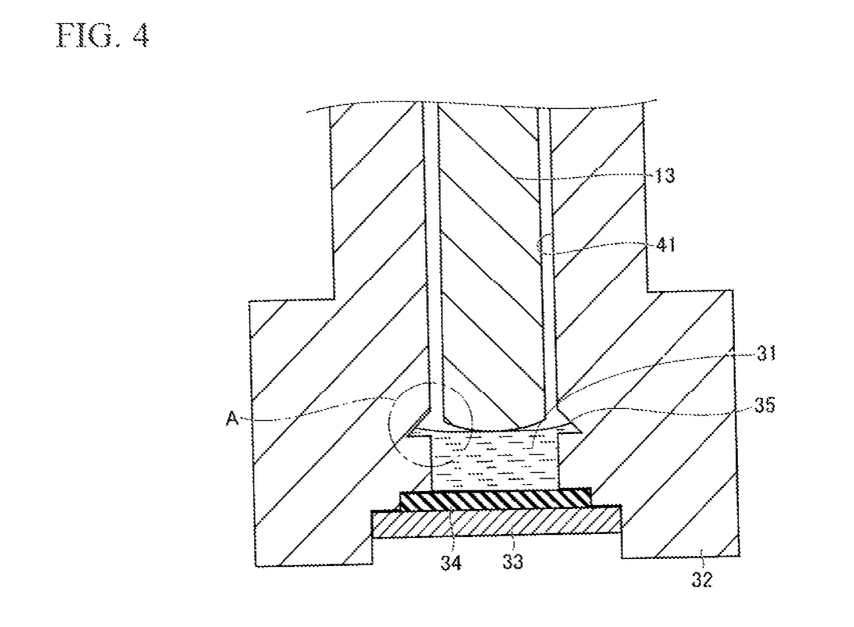
FIG. 4 is a sectional view showing a second step of the method of assembling the polygon scanner motor.
Figure 5:
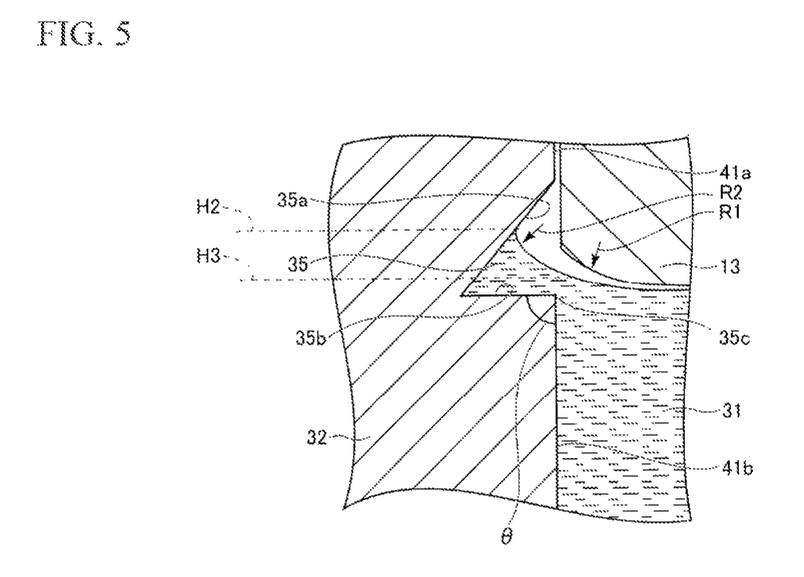
FIG. 5 is an enlarged view of a portion of FIG. 4.

FIG. 4 is a sectional view showing a second step of the method of assembling the polygon scanner motor of the embodiment of the invention. FIG. 5 is an enlarged view of a portion A of FIG. 4.

As shown in FIGS. 4 and 5, then, the shaft 13 is inserted into the bearing hole 41. The groove 35 is configured by, for example, an inner wall surface 35a and an inner wall surface 35b, and, in the embodiment, has a triangular sectional shape. The inner wall surface 35a constitutes a space having a linearly tapered shape in which the diameter is reduced as advancing in, for example, the upward direction. The inner wall surface 35a is adjacent to the inner wall surface constituting the upper portion 41a. The inner wall surface 35b is adjacent to the inner wall surface constituting the lower portion 41b, and forms a corner portion 35c with respect to the inner wall surface constituting the lower portion 41b. In the embodiment, in a section (the section shown in FIGS. 4 and 5) which is taken along a plane containing the rotation axis R (plane containing the shaft 13), an angle θ (angle θ of the corner portion 35c) formed by the inner wall surface 35b and the inner wall surface constituting the lower portion 41b is 90 deg. The groove 35 may have an arbitrary shape.

In the state where the shaft 13 is not yet inserted into the bearing hole 41, the liquid surface H2 of the oil 31 in the part where the oil is in contact with the inner wall surface of the bearing hole 41 is raised by the surface tension of the oil 31. This functions in the direction along which the liquid surface curvature radius of the oil 31 is reduced. However, the liquid surface H3 of the oil 31 in the vicinity of the corner portion 35c is raised (separated from the corner portion 35c) by the surface tension of the oil 31. This functions in the direction along which the liquid surface curvature radius of the oil 31 is increased. In the state where the shaft 13 is not yet inserted into the bearing hole 41, as a result, the maximum value R2 of the liquid surface curvature radius of the oil 31 is increased by the function of the corner portion 35c. The maximum value R2 is larger than the maximum value of the liquid surface curvature radius of oil in the conventional art.

Preferably, the angle θ is set so that the maximum value R2 is larger than the curvature radius R1 of the lower end surface 13a of the shaft 13. The liquid surface curvature radius of the oil 31 may be measured, for example, by cutting the sleeve 32 along a plane containing the rotation shaft R, pouring the oil 31 into the bearing hole 41 which is hermetically closed by adhering a transparent plate to the section, and taking an image of the liquid surface of the poured oil 13 by an imaging device such as a CCD (Charge Coupled Device) camera.

Figure 6:
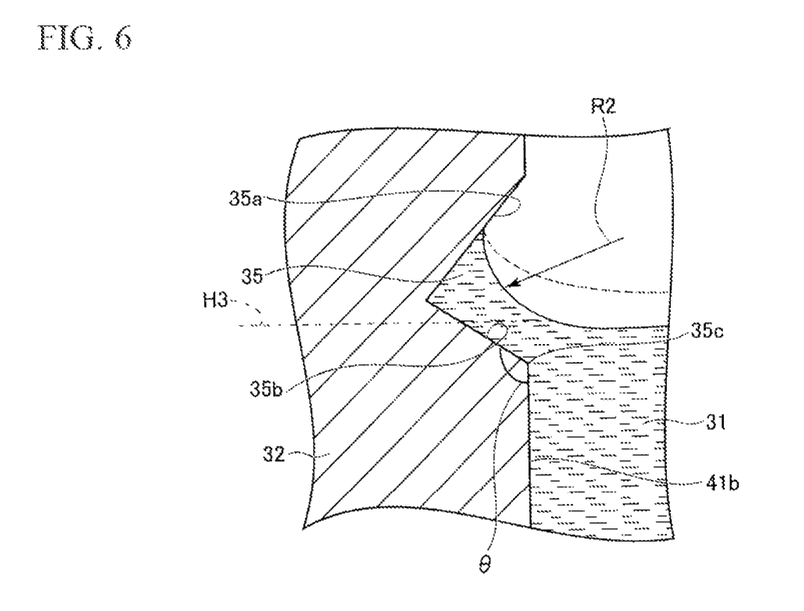
FIG. 6 is a view schematically showing the liquid surface of oil in the case where an angle θ exceeds 90 deg.

FIG. 6 is a view schematically showing the liquid surface of the oil 31 in the case where the angle θ exceeds 90 deg. In FIG. 6, the liquid surface of the oil 31 in the case where the angle θ is 90 deg. is indicated by a broken line.

The larger the angle θ than 90 deg., the weaker the effect of raising the liquid level of the oil 31 by the surface tension of the oil 31, and the liquid surface H3 of the oil 31 is lowered. As a result, the maximum value R2 of the liquid surface curvature radius of the oil 31 in the case where the angle θ exceeds 90 deg. is smaller than the maximum value R2 of the liquid surface curvature radius of the oil 31 in the case where the angle θ is equal to 90 deg. (the case of FIG. 5). In order to sufficiently attain the effect of raising the oil 31, it is preferred to set the angle θ to 100 deg. or smaller. In order to cause the oil 31 to surely contact with the inner wall surface 35*a*, moreover, it is preferred to set the angle θ to 80 deg. or larger.

After the insertion of the shaft 13, the state shown in FIG. 2 is obtained. At this state, the groove 35 may serve as an escaping portion for allowing the air to escape.

According to the embodiment, in the state where the shaft 13 is not yet inserted into the bearing hole 41, the liquid surface H2 of the oil 31 in the part where the oil is in contact with the inner wall surface of the bearing hole 41 is positioned in the groove 35. Therefore, the liquid surface of the oil 31 is raised by the corner portion 35*c*, and the liquid surface curvature radius of the oil 31 is increased. According to the configuration, a situation easily occurs where the lower end surface 13*a* of the shaft 13 is in contact with the oil 31 before the side surface of the shaft 13 becomes more in contact with the oil 31, and the air becomes more unlikely to be trapped at the lower portion of the shaft 13. As a result, the air is sufficiently evacuated from the oil 31, and the filling ratio of the oil 31 can be improved so that the reliability of the fluid bearing can be enhanced. Moreover, the life of the fluid bearing can be prolonged. Since it is configured that the air is more unlikely to be trapped into the bearing, the load of the bearing is not fluctuated, and a stable rotation is achieved. Furthermore, the fluid bearing can be simplified in structure, and therefore can be economically provided.

Figure 7:
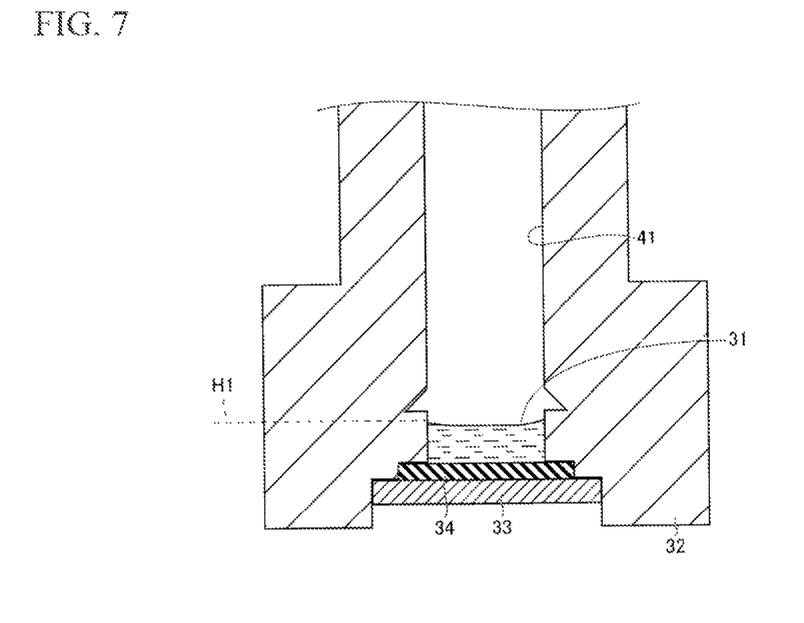
FIG. 7 is a view schematically showing a state where a shaft is pulled out from a bearing hole of the assembled fluid bearing.

FIG. 7 is a view schematically showing a state where the shaft 13 is pulled out from the bearing hole 41 of the assembled fluid bearing 30.

As shown in FIG. 7, in the case where the shaft 13 is pulled out from the bearing hole 41 of the assembled fluid bearing 30 (assembled polygon scanner motor), the liquid surface (top surface) H1 of the oil 31 in the part where the oil is in contact with the inner wall surface of the bearing hole 41 is positioned in the groove 35 or below (on the side of the thrust cover 33) the groove 35 (in other words, the liquid surface H1 exists below the upper end portion of the groove 35).

The liquid surface H2 (FIG. 3) in the state where the shaft 13 is not yet inserted into the bearing hole 41 is more separated from (higher than) the thrust cover 33 than the liquid surface H1 (FIG. 7) in the state where the shaft 13 is pulled out from the bearing hole 41 of the assembled fluid bearing 30. because of the following reason. When the shaft 13 is inserted into the bearing hole 41, the oil 31 adheres to the shaft 13, and also to the inner wall surface of the bearing hole 41 which is higher in level than the groove 35. When the shaft 13 is then pulled out from the bearing hole 41, part of the oil 31 adhering to the shaft 13 is discharged to the outside of the bearing hole 41. Moreover, part of the oil 31 adhering to the inner wall surface of the bearing hole 41 does not drop in the lower portion of the bearing hole 41, but remains on the inner wall surface of the bearing hole 41. As a result, the quantity of the oil 31 which is in the lower portion of the bearing hole 41 is reduced, and the liquid surface H2 is lowered to the liquid surface H1.

Figure 8:
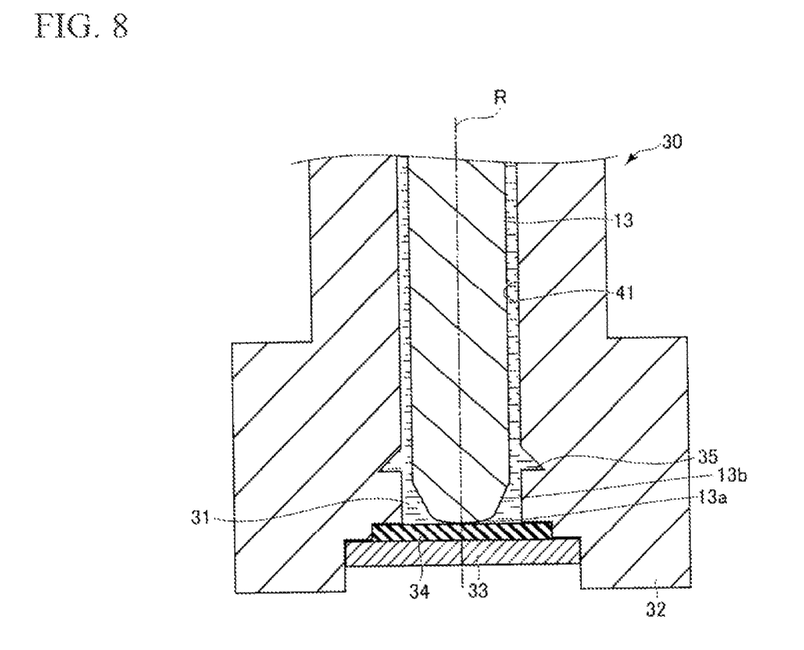
FIG. 8 is a sectional view showing a configuration of the fluid bearing according to a first modification of the present invention.
Figure 9:
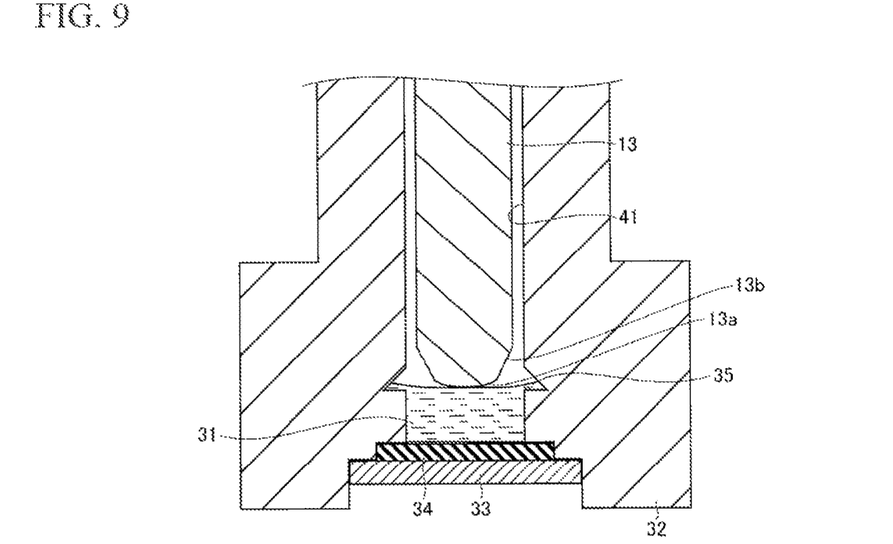
FIG. 9 is a view schematically showing a manner of inserting the shaft into the bearing hole in the first modification.

FIG. 8 is a sectional view showing a configuration of the fluid bearing 30 according to a first modification of the invention. FIG. 9 is a view schematically showing a manner of inserting the shaft 13 into the bearing hole 41 in the first modification.

As shown in FIG. 8, in the fluid bearing 30 according to the first modification, the lower portion of the shaft 13 has a tapered shape. The side surface 13*b* of the shaft 13 which is adjacent to the lower end surface 13*a* is inclined with respect to the rotation axis R. According to the configuration, the side surface 13*b* of the shaft constituting the tapered surface is located on a further inner side (on the side of the rotation axis R). As shown in FIG. 9, therefore, a situation occurs more easily where the lower end surface 13*a* of the shaft is in contact with the oil 31 before the side surface 13*b* of the shaft becomes in contact with the oil 31, and the air becomes more unlikely to be trapped at the lower portion of the shaft 13.

Figure 10:
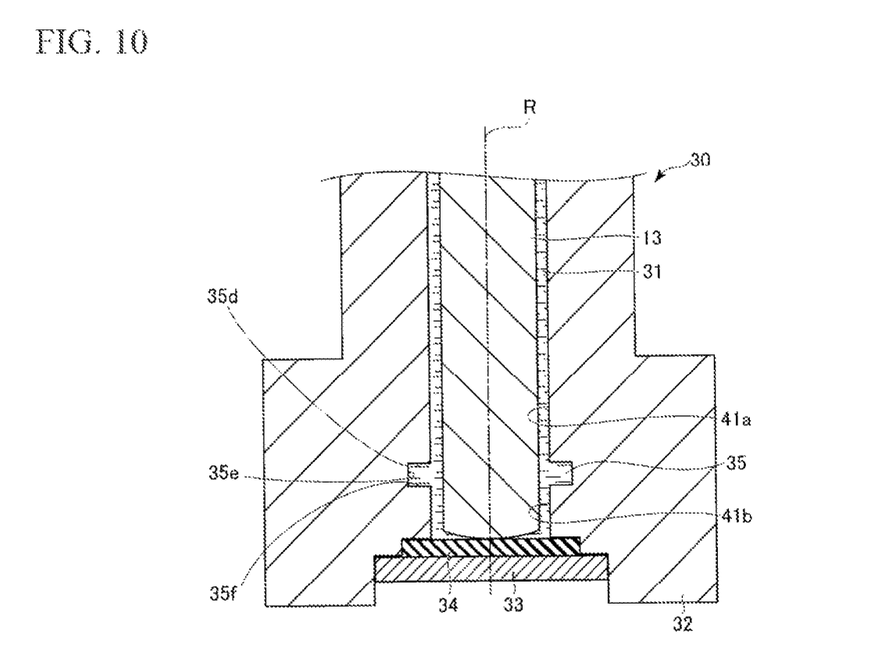
FIG. 10 is a sectional view showing the configuration of the fluid bearing according to a second modification of the present invention.
Figure 11:
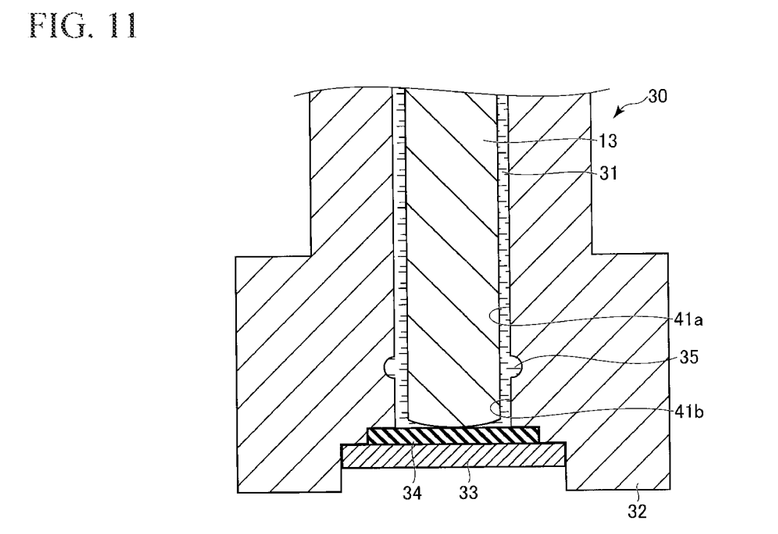
FIG. 11 is a sectional view showing the configuration of the fluid bearing according to a third modification of the present invention.

FIG. 10 is a sectional view showing a configuration of the fluid bearing 30 according to a second modification of the invention. FIG. 11 is a sectional view showing a configuration of the fluid bearing 30 according to a third modification of the invention.

As shown in FIG. 10, in the fluid bearing 30 according to the second modification, the groove 35 of the sleeve 32 has a rectangular sectional shape. In other words, the groove 35 is configured by: an inner wall surface 35*d* which is adjacent to the inner wall surface constituting the upper portion 41*a*, and which extends perpendicularly with respect to the rotation axis R; an inner wall surface 35*f* which is adjacent to the inner wall surface constituting the lower portion 41*b*, and which extends perpendicularly with respect to the rotation axis R; and an inner wall surface 35*e* which is interposed between the inner wall surfaces 35*d* and 35*f*, and which extends in parallel to the rotation axis R.

As shown in FIG. 11, in the fluid bearing 30 according to the third modification. the groove 35 of the sleeve 32 has a semicircular sectional shape. In other words, the groove 35 is configured by an arcuate inner wall surface which is interposed between the inner wall surface constituting the upper portion 41*a*, and that constituting the lower portion 41*b*.

The fluid bearing of the invention may be applied to an inner-rotor type motor in which a rotor disposed on the inner diameter side rotates with respect to a stator disposed on the outer diameter side. Moreover, the fluid bearing of the invention may be applied to a circumferential confronting type motor in which a rotor and a stator are opposed to each other in a radial direction (along the circumference), or to a planar facing type motor in which a rotor that is disposed in the upper side along the extending direction of a shaft rotates with respect to a stator that is disposed in the lower side along the extending direction of the shaft. Furthermore, the fluid bearing may be applied to a shaft-fixed type motor in which a shaft is fixed, and a sleeve is rotated. Furthermore, the magnets may be disposed on a rotation body including a shaft, or on a rotation body including a sleeve.

In the case where the fluid bearing of the invention is applied to a brushless motor, the motor may be driven by the full-wave rectifying method or the half-wave rectifying method.

It should be understood that the whole of the embodiment is illustrative and not restrictive. The scope of the invention is defined by the appended claims rather than the above description, and equivalence of the claims, and all changes that fall within the scope are intended to be embraced by the claims.

What is claimed is:

1. A fluid bearing comprising:
a sleeve having a bearing hole;
a shaft disposed within the bearing hole and rotatable with respect to the sleeve;
a thrust portion that is fixed to the sleeve and covers one end portion of the bearing hole;
a gap between the sleeve and the shaft; and
a liquid disposed within the gap,
wherein the bearing hole is configured to have:
a first portion having a first diameter;
a second portion that is located at an end portion that is closer to the thrust portion than the first portion, the second portion having a second diameter that is substantially the same with the first diameter; and
a large-diameter portion that is located at a position between the first portion and the second portion, the large-diameter portion having a third diameter that is larger than the first diameter, the third diameter changing in a direction of a rotation axis of the shaft.

2. The fluid bearing according to claim 1, wherein:
the thrust portion is fixed to the sleeve to cover the one end portion of the bearing hole;
a liquid surface of the liquid is in contact with an inner wall surface of the bearing hole in the large-diameter portion.

3. The fluid bearing according to claim 1,
wherein, the shaft is selectively removable from the bearing hole and a liquid surface of the liquid which is in contact with an inner wall surface of the bearing hole is positioned in the large-diameter portion or closer to a side of the thrust portion than the large-diameter portion in a state where the shaft is removed from the bearing hole.

4. The fluid bearing according to claim 1,
wherein the shaft is selectively removable from the bearing hole, and
wherein a liquid surface of the liquid is in contact with an inner wall surface of the bearing hole in the large-diameter portion in a state where the shaft is removed from the bearing hole.

5. The fluid bearing according to claim 1,
wherein the large-diameter portion comprises inner wall surfaces defining a space having a tapered shape in which a diameter thereof decreases as the distance from the thrust portion increases.

6. The fluid bearing according to claim 1,
wherein an angle formed by an inner wall surface constituting the second portion and an inner wall surface which constitutes the large-diameter portion, and which is adjacent to the inner wall surface constituting the second portion, is equal to or larger than 80 deg., and equal to or smaller than 100 deg.

7. The fluid bearing according to claim 1,
wherein the shaft is selectively removable from the bearing hole, and
wherein, a maximum value of a liquid surface curvature radius of the liquid in the bearing hole is larger than a curvature radius of a leading end of the shaft at a side of the thrust portion in a state where the shaft is removed from the bearing hole.

8. A motor comprising:
the fluid bearing according to claim 1;
a magnet disposed in a rotation body including one of the shaft and the sleeve; and
a coil disposed on a stator core, the coil configured to generate a driving force by an interaction with magnetic fields of the magnet.

9. A polygon mirror scanner motor, comprising:
the motor according to claim 8; and
a polygon mirror that is configured to be rotated by the motor.

10. The fluid bearing according to claim 1,
wherein the large-diameter portion is configured by inner wall surfaces defining a space having a round shape.

11. The fluid bearing according to claim 1,
wherein the large-diameter portion is configured by inner wall surfaces defining a space having a semicircular sectional shape.

12. The fluid bearing according to claim 1,
wherein the large-diameter portion is configured by arcuate inner wall surfaces.

13. A fluid bearing comprising:
a sleeve having a bearing hole;
a shaft disposed within the bearing hole and configured to be rotatable with respect to the sleeve;
a thrust portion that is fixed to the sleeve and covers one end portion of the bearing hole;
a gap between the sleeve and the shaft; and
a lubricant disposed within the gap,
wherein an inner surface of the sleeve includes:
a first portion having a first diameter;
a second portion that is located at an end portion that is closer to the thrust portion than the first portion, the second portion having a second diameter that is substantially the same with the first diameter; and
a third portion having a groove that is located at a position between the first portion and the second portion, the groove having a depth changing in a direction of a rotation axis of the shaft.

14. The fluid bearing according to claim 13,
wherein the third portion has a third diameter within the groove, the third diameter being larger than the first diameter and the second diameter.

15. The fluid bearing according to claim 14,
wherein the third diameter of the third portion of the sleeve within the groove decreases as a distance from the thrust portion increases.

16. The fluid bearing according to claim 13,
wherein an angle formed by an inner wall surface of the second portion and an inner wall surface of the third portion is equal to or larger than 80 degrees, and equal to or smaller than 100 degrees.

17. The fluid bearing according to claim 13,
wherein the groove has a round shape.

18. The fluid bearing according to claim 13,
wherein the groove has a semicircular section shape.

19. The fluid bearing according to claim 13,
wherein the groove has a first surface and a second surface,
wherein the first surface is connected between an inner wall surface of the first portion and the second surface, and
wherein the second surface is connected between the first surface and an inner wall surface of the second portion.

20. The fluid bearing according to claim 19,
wherein the first surface is inclined with respect to the inner wall surface of the first portion.

21. A motor comprising:
the fluid bearing according to claim 13;
a magnet disposed in a rotation body including one of the shaft and the sleeve; and
a coil disposed on a stator core, the coil configured to generate a driving force by an interaction with magnetic fields of the magnet.

22. A polygon mirror scanner motor comprising:
the motor according to claim 21; and
a polygon mirror that is configured to be rotated by the motor.

* * * * *